(12) United States Patent
Zhang et al.

(10) Patent No.: US 7,835,889 B1
(45) Date of Patent: Nov. 16, 2010

(54) VARIABLE TRANSPORT DELAY MODELLING MECHANISM

(75) Inventors: Fu Zhang, Natick, MA (US); Murali Yeddanapudi, Watertown, MA (US)

(73) Assignee: The MathWorks, Inc., Natick, MA (US)

( * ) Notice: Subject to any disclaimer, the term of this patent is extended or adjusted under 35 U.S.C. 154(b) by 1438 days.

(21) Appl. No.: 11/221,160

(22) Filed: Sep. 6, 2005

(51) Int. Cl.
*G06F 17/10* (2006.01)
(52) U.S. Cl. .......................................................... 703/2
(58) Field of Classification Search ....................... 703/2
See application file for complete search history.

(56) References Cited

U.S. PATENT DOCUMENTS

| 6,732,064 | B1 * | 5/2004 | Kadtke et al. ............... 702/189 |
| 7,495,450 | B2 * | 2/2009 | Furse et al. .................. 324/519 |
| 2002/0064171 | A1 * | 5/2002 | Belk ........................... 370/412 |
| 2005/0259754 | A1 * | 11/2005 | Ho et al. ................. 375/240.28 |

OTHER PUBLICATIONS

Dermanovic et al., B. Modeling of Transport Delay on Ethernet Communications Networks, Proceedings of the 12th IEEE Mediterranean Electrotechnical Conference, May 2004, pp. 367-370.*
Casetti et al., A Framework for the Analysis of Adaptive Voice over IP, IEEE International Conference on Communications, 2000, pp. 821-826.*

* cited by examiner

*Primary Examiner*—Russell Frejd
(74) *Attorney, Agent, or Firm*—Lahive & Cockfield, LLP; Kevin J. Canning (57) ABSTRACT

A method, system and apparatus for generating a variable transport delay for use in modeling a dynamic system. The variable transport delay of the present invention may be calculated using a variety of means, including the use of a lookup table generated at a variety of time steps such that an accurate variable transport delay can be calculated by interpolation.

37 Claims, 4 Drawing Sheets

| | 0 | 1 | 2 | 3 | 4 | 5 | 6 | 7 |
|---|---|---|---|---|---|---|---|---|
| t | 0 | 0.2 | 0.5 | 0.6 | 0.9 | 1.1 | 2 | 2.1 |
| x | 0 | 0.7 | 1.2 | 1.4 | 1.8 | 2 | 2.1 | 2.3 |
| u | 1 | 1.4 | 1.6 | 0.5 | 4.7 | 5.5 | 1.2 | 2 |
| L | 0.8 | 0.9 | 1.3 | 1.9 | 2.7 | 3.4 | 4.6 | 7.9 |

Fig. 7B

VARIABLE TRANSPORT DELAY MODELLING MECHANISM

FIELD OF THE INVENTION

The present invention relates to a variable transport delay, and more particularly to a system, apparatus and method for providing a variable transport delay for use with a graphical block diagram environment.

BACKGROUND OF THE INVENTION

The modeling of physical systems oftentimes requires the modeling of transport delays inherent in these physical systems. Models of physical systems that use transport delays include models of transportation systems, airports, or conveyor belt arrangements. These transport delays may be best viewed as the time required for a material to go through a buffer of know size at a known speed. The simplest forms of transport delays are exhibited by a constant delay assigned to a signal which results in the delivery of the input signal at a fixed time in the future. In situations where the speed of material transfer through the buffer is constant, a variable time delay may be computed.

An existing variable time delay is best exhibited by example. A common use of variable time delay is seen in the flow of an incompressible fluid through a pipe with an output located at length L distance away from the input. This length L can be best understood as a buffer between input and output. In such a setting, there will be a time delay $t_d$ determined by the length of the transportation and the speed of the transportation. To simplify the example, it is assumed that the speed of the transportation (i.e. the fill rate of the buffer) at the inlet of the pipe is $v_i(t)$ and the speed at the outlet is $v_o(t)$. For further simplification, it will be assumed that $v_i(t)$ and $v_o(t)$ are equal, as the fluid traversing the length L is incompressible. Further associated with the present example are input $u_i$ and output $u_o$ which denote specific properties of the transported material, such as temperature at the inlet and outlet. Generally speaking, the relationship of $u_i$ to $u_o$ can be defined such that $u_o$ is a delayed $u_i$ and the delay is caused by the transportation. Representing this as an equation yields $u_o=u_i(t-t_d)$.

To determine a variable time delay, it is necessary to solve for $t_d$ based on the transport speed $v_i$ and the length L of the pipe. If the conservation variable at the inlet of the pipe is defined as $$L_i(t) = \int_{t_0}^{t} v_i(\tau) d\tau$$

and the conservation variable at outlet of the pipe is defined as $$L_o(t) \int_{t_0}^{t} v_o(\tau) d\tau$$

then $L_i(t)-L_o(t)=L$.

Additionally, as $L_o(t)=L_i(t-t_d)$, it is therefore evident that:

$v_i(t)=v_o(t)$ $L_i(t)-L_i(t-t_d)=L$

Note, however, that the delay set forth above is only constant if the velocity is constant, making it only possible to study velocity related properties or the conservation variable at the inlet and the outlet using the above equation.

In many modern systems, however, such a constant velocity is not applicable. For example, fluid flow velocity through the aforementioned pipe may be increased by the addition of a variable speed pump, such that velocity of the fluid is no longer constant. In view of this, a need to study some other property associated with the system at the input and output of the system is required. Namely, a need to determine a variable transport delay wherein the variables are not bound by existing assumptions is required to more accurately model dynamic systems.

BRIEF DESCRIPTION OF THE DRAWINGS

The present invention will become better understood with reference to the following description and accompanying drawings, wherein.

DETAILED DESCRIPTION

FIGS. 1 through 6, wherein like parts are designated by like reference numerals throughout, illustrate an example embodiment of a variable transport delay according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 1:
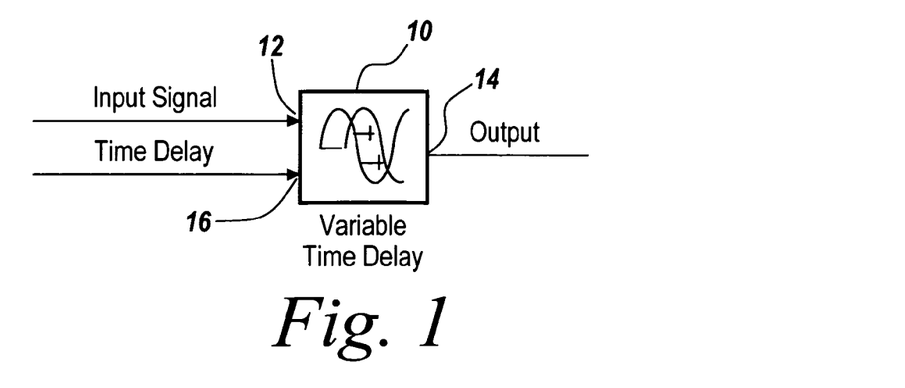
FIG. 1 is an exemplary variable time delay block as understood within the prior art.

FIG. 1 depicts a conventional variable time delay block 10 as understood in the prior art. This variable time delay block 10 can be used in conjunction with a graphical modeling environment, such as the Simulink® block diagram environment offered by The MathWorks, Inc. of Natick, Mass. One skilled in the art will readily recognize that the time delay block of the present invention may be utilized within numerous alternative block diagram modeling environments. The Variable time delay block 10 includes an input port 12 and an output port 14. A signal provided to the input port 12 is delayed by a specific time prior to delivery to the output port 14. This delay time 16 is user configurable. When used within a block diagram modeling environment, at the start of the simulation, the block outputs the input signal parameter provided to the input port 12 until the simulation time exceeds the preconfigured time delay parameter 16, when the block begins generating the delayed input. The time delay parameter must be nonnegative.

This conventional time delay stores input points and simulation times during a simulation in a buffer whose initial size is user defined. When used within a Simulink® environment, should the number of points exceed the buffer size, the block allocates additional memory and Simulink® displays a message after the simulation that indicates the total buffer size needed. Because allocating memory slows down the simulation, this parameter value must be defined carefully if simulation speed is an issue. For long time delays, this block might use a large amount of memory, particularly for a dimensionalized input.

When output is required at a time that does not correspond to the times of the stored input values, the block interpolates linearly between points. When the delay is smaller than the step size, the block extrapolates from the last output point, which can produce inaccurate results. Because the block does not have direct feedthrough, it cannot use the current input to calculate its output value. Such a situation is best illustrated by example. Consider a fixed-step simulation with a step size of 1 and the current time at t=5. If the delay is 0.5, the block needs to generate a point at t=4.5. Because the most recent stored time value is at t=4, the block performs forward extrapolation.

Figure 2:
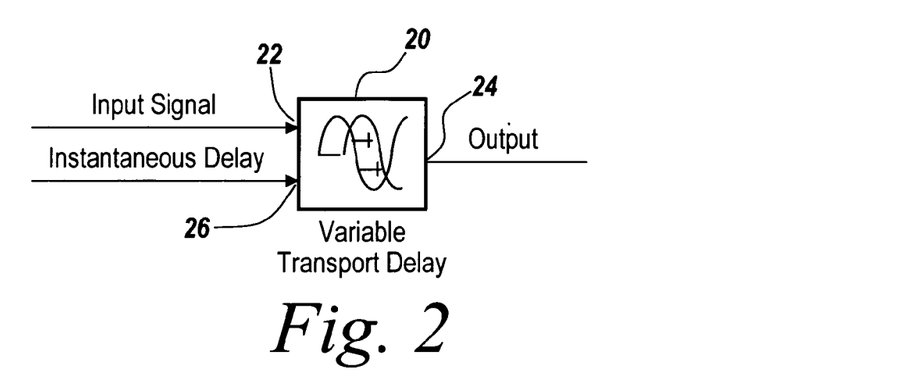
FIG. 2 is an exemplary variable transport delay block in accordance with one aspect of the present invention.

FIG. 2 is an illustrative example of the variable transport delay 20 of an embodiment of the present invention, which is used within a graphical block diagram environment, such as Simulink®. One skilled in the art will recognize that the variable transport delay of the present invention does not need to be used exclusively within a block diagram modeling environment. The illustration of a block for use within a block diagram modeling environment is solely for illustrative purposes and is not intended to be limiting in scope. The variable transport delay 20 of the present invention includes an input 22 capable of receiving an input signal, and an output 24 capable of delivering an output signal to the modeling environment. Further associated with the variable transport delay block 20 is an instantaneous delay signal 26. This instantaneous delay signal can be viewed as an estimated time of arrival, and is best understood by example.

Given an exemplary pipe of length L, with initial input parameters $v_i, u_i$ and output parameters $v_o, u_i(t-t_d)$, as illustrated below, Applying conservation principles yields:

$$L = \int_{t-td}^{t} v_i(\tau) d\tau \quad \text{(Equation 1)}$$

Normalizing Equation 1 by dividing by L further yields:

$$1 = \int_{t-td}^{t} \frac{v_i(\tau)}{L} d\tau = \int_{t-td}^{t} \frac{\frac{1}{L}}{v_i(t)} d\tau \quad \text{(Equation 2)}$$

wherein:

$$\frac{L}{v_i(t)} = T_D$$

such that $T_D$ is called instantaneous delay or can be understood as estimated time of arrival. In view of this, Equation 2 can be rewritten as:

$$1 = \int_{t-td}^{t} \frac{1}{T_D} d\tau \quad \text{(Equation 2')}$$

The use of a pipe with an incompressible flow is solely for illustrative purposes and as such not intended to be limiting on scope of the present invention. For example, the variable transport delay generated in accordance with the present invention may be used in modeling conveyor belt delivery or products, automotive applications and traffic flow, for example.

Figure 3:
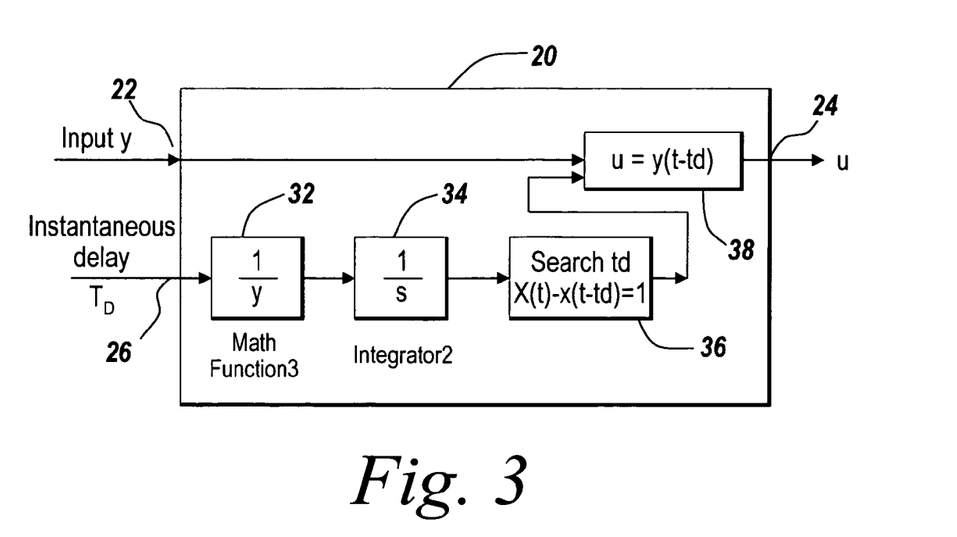
FIG. 3 is a sample of the internal processing arrangement of the sample variable transport delay block of the present invention.

FIG. 3 is an illustrative example of the Variable Transport Delay 20 block of FIG. 2, wherein illustrative internal steps of a sample Variable Transport Delay block 20 are illustrated for use in determining an output 24 that is delayed. These steps serve to illustrate a sample variable transport delay block and are not exclusive to the operation of a variable transport delay block used to generate a variable transport delay. One skilled in the art will readily recognize that numerous alternative means exist by which a variable transport delay is ultimately calculated.

To calculate a real time delay $t_d$ in accordance with the illustrative embodiment the integration equation 2' must first be solved. Following this step, $u(t-t_d)$ can then be solved. In the illustrative embodiment, the instantaneous delay $T_D$ is first inverted by the inversion element 32, yielding $$\frac{1}{T_D}.$$

The output of the inversion element 32 is passed to an integrator 34. This integrator may take numerous forms, as understood by one skilled in the art. For example, in one embodiment the integration equation 2' can be solved using a stacked buffer of input u,t and the integration of $$\frac{1}{T_D}.$$

The output equation 38 $y=u(t-t_d)$, where $t_d$ is determined by equation (2'), such that a variable transport delay output 24 is generated. This variable transport delay can be used in conjunction with a graphical block diagram modeling environment to simulate various dynamic systems exhibiting non-uniform delay characteristics.

Figure 4:
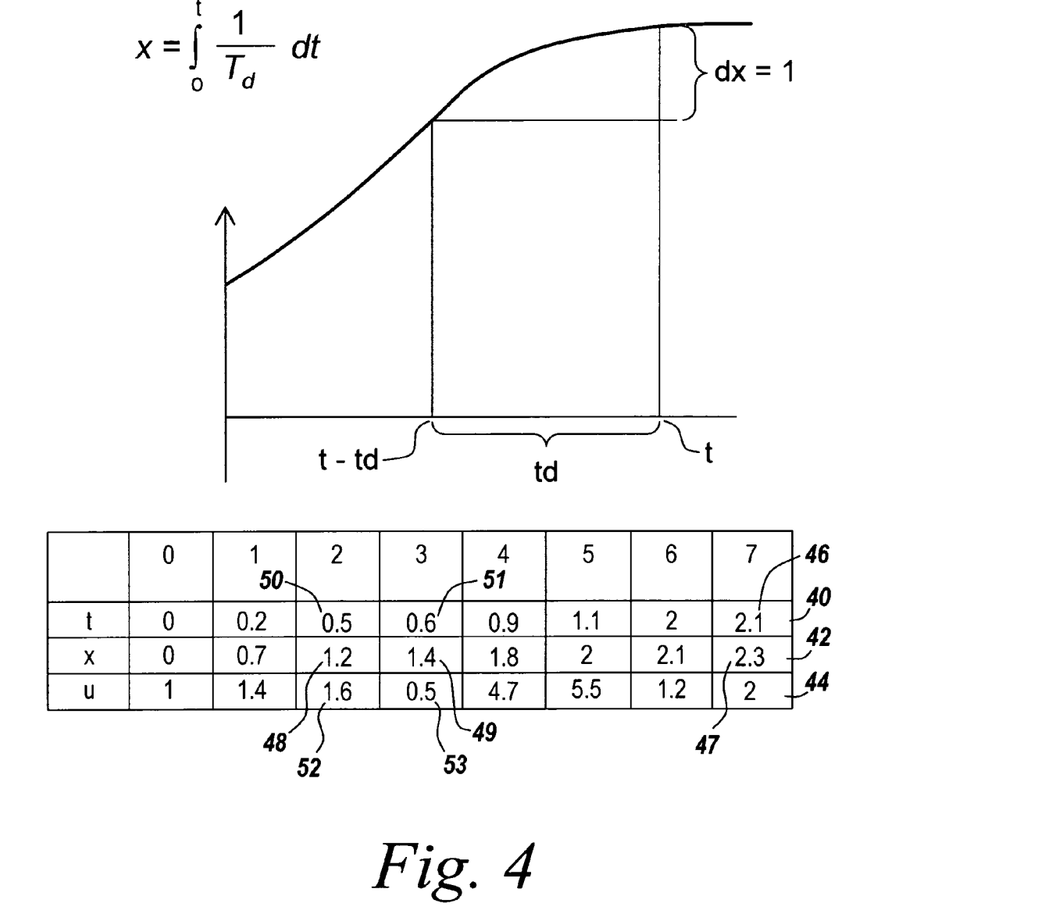
FIG. 4 is a graphical depiction of the integration process utilized in calculating a variable transport delay according to one aspect of the present invention.

FIG. 4 is an illustrative method for solving the output equation 38 using a lookup table arrangement. This illustrative method is not exclusive of the lookup table arrangement which may be employed with the current application. Numerous computation means, as understood by one skilled in the art, may be employed for use in calculating the value of:

$$1 = \int_{-t_d}^{t} \frac{1}{T_D} d\tau \qquad \text{(Equation 2')}$$

set forth prior. In the present embodiment, as illustrated in FIG. 4, the time vector t is initially stored. As illustrated, the time vector t is stored in row 40, wherein each column represents a different time step. In the present illustration the time step between columns is uniform, yet the present application may be practiced with non-uniform time steps.

Following the storage of the time vector t, x is calculated using the integration of:

$$\frac{1}{T_D} d\tau$$

wherein $$x = \int_0^t \frac{1}{T_D} dt.$$

Further note that $$T_D = \frac{L}{v_i(t)}.$$

The value of x is then stored in row 42 of the lookup table at a variety of time steps, each designating an individual column. Additionally, the input value of u(t) is further stored in an individual row (row 44).

To determine the output of the variable transport block, it is necessary to determine a time at which this output is required. For example, should the output be required at a time of t=2.1 seconds 46 (i.e. the 7$^{th}$ time interval) an attempt at calculating $t_d$ will occur. As the value of:

$$x(7)47 - x(2)48 = 2.3 - 1.2 = 1.1 > 1 \text{ and}$$

$$x(7)47 - x(3)48 = 2.3 - 1.4 = 0.9 < 1$$

it is clear that:

$$t(2)50 < t - td < t(3) \rightarrow 0.5 < t - td < 0.6.$$

Using the method of interpolation it can be determined that t−td=0.55. This interpolation information can further be used to find u(0.55). As u(0.5)=1.6 (52) and u (0.6)=0.5 (53) the value of u(0.55) can be interpolated. This output may then be passed to a graphical block diagram modeling environment for use in further simulation.

One skilled in the art will readily recognize that the use of a lookup table arrangement is not the exclusive means by which the present invention may be practiced. One skilled in the art will note that numerous alternative means to calculate the integration result can be employed. Such means include, but are not limited to conversion of solving an integration equation, as set forth above, to the solving of a differential equation. For example, the conservation variable of the inlet of the aforementioned pipe can be defined as:

$$L_i(t) = \int_{t_0}^{t} v_i(\tau) d\tau$$

while the conservation variable of the outlet can be defined as:

$$L_o(t) = \int_{t_0}^{t} v_o(\tau) d\tau$$

In view of this, $$L_i(t) - L_o(t) = L, \text{ and}$$

$$L_o(t) = L_i(t - t_d), \text{ therefore:}$$

$$v_i(t) = v_o(t)$$

$$L_i(t) - L_i(t - t_d) = L \qquad \text{(Equation 3)}$$

Following the differentiation of Equation (3) with respect to t yields:

$$v_i(t) - v_i(t - t_d)\left(1 - \frac{dt_d}{dt}\right) = 0 \qquad \text{(Equation 4)}$$

$$\frac{dt_d}{dt} = 1 - \frac{v_i(t)}{v_i(t - t_d)} \qquad \text{(Equation 5)}$$

Wherein $v_i$ is the transport speed.

In view of the above, the aforementioned Equation 2 has been converted into a differential equation, as illustrated in Equation 5, which may be solved using known computation techniques. For example, the Simulink variable time block can be used to solve the differential equation of Equation 5.

Figure 5:
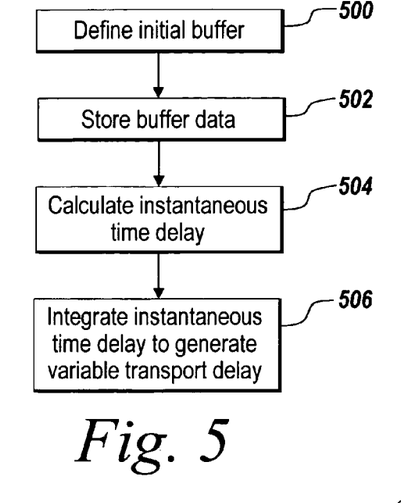
FIG. 5 is a flowchart of the steps required in generating a variable transport delay according to one aspect of the present invention.

FIG. 5 is a flowchart illustrating the steps necessary in practicing one embodiment of the present invention. As illustrated in step 500, an initial buffer is first defined. This buffer is capable of storing buffer data, starting at an initial time and ending at a final time, in accordance with step 502. Data stored by this buffer may take numerous forms and may include, but is not limited to, velocity, acceleration data or mass flow data. In view of the flow of fluid through a pipe example, set forth prior, initial and final buffer data may be input and output velocity data. Following the collection and storage of buffer data an instantaneous time delay is computed in accordance with step 504. This instantaneous time delay may be viewed as an estimated time of arrival as a material traverses a length beginning at an input and ending at an output. As set forth earlier, in view of the incompressible flow through a pipe example, the instantaneous delay $$T_D = \frac{L}{v_i(t)}.$$

The calculation of instantaneous delay may occur using various means, including but not limited to computer based solutions. Following calculation of instantaneous delay in accordance with step 504 the instantaneous delay is integrated to generate a variable transport delay 506. Integration of this instantaneous delay can occur using computer based integration means, such as interpolation using a lookup table, or may occur following the conversion of the integral into a differential equation.

Figure 6:
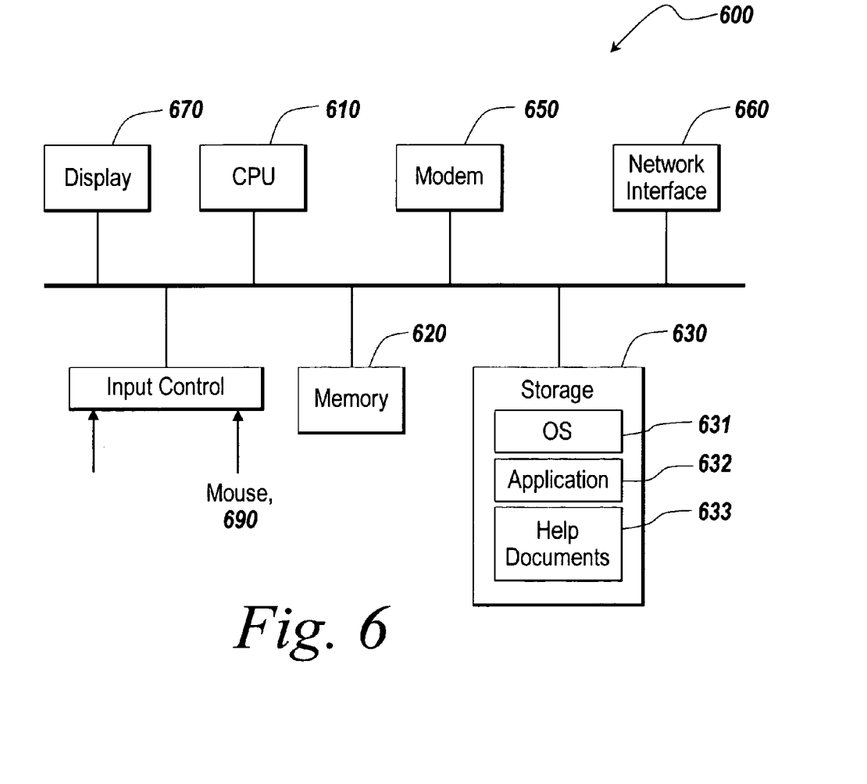
FIG. 6 is an illustrative embodiment of a computing systems used in practicing one aspect of the present invention.

FIG. 6 is an exemplary computing device 600 suitable for practicing the illustrative embodiment of the present invention, which provides a block diagram environment. One of ordinary skill in the art will appreciate that the computing device 600 is intended to be illustrative and not limiting of the present invention. The computing device 600 may take many forms, including but not limited to a workstation, server, network computer, quantum computer, optical computer, bio computer, Internet appliance, mobile device, a pager, a tablet computer, and the like.

The computing device 600 may be electronic and include a Central Processing Unit (CPU) 610, memory 620, storage 630, an input control 640, a modem 650, a network interface 660, a display 670, etc. The CPU 610 controls each component of the computing device 600 to provide the block diagram environment and to apply a coding standard to a block diagram in the block diagram environment. The memory 620 temporarily stores instructions and data and provides them to the CPU 610 so that the CPU 610 operates the computing device 600 and runs the block diagram environment. The storage 630 usually contains software tools for applications. The storage 630 includes, in particular, code 631 for the operating system (OS) of the device 600, code 632 for applications running on the operation system including applications for providing the block diagram environment, and data 633 for block diagrams created in the block diagram environment and for one or more coding standards applied to the block diagrams.

The input control 640 may interface with a keyboard 680, a mouse 690, and other input devices. The computing device 600 may receive through the input control 640 input data necessary for creating block diagrams, such as the selection of the attributes and operations of component blocks in the block diagrams. The computing device 600 may also receive input data for applying a coding standard to a block diagram, such as data for selecting the coding standard, data for customizing the coding standard, data for correcting the violation of the coding standard in the block diagram, etc. The computing device 600 may display in the display 670 user interfaces for the users to edit the block diagrams. The computing device 600 may also display other user interfaces, such as a user interface for selecting a modeling standard, a user interface for customizing the modeling standard, a user interface for displaying a corrected block diagram that removes the violation of the modeling standard, etc.

Figure 7A:
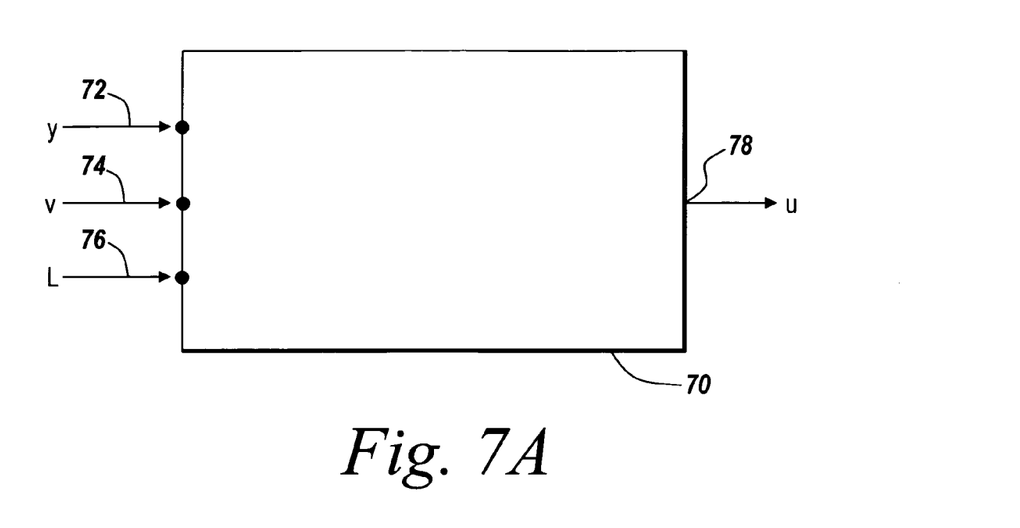
FIG. 7A is an exemplary variable transport delay block in accordance with one aspect of the present invention

FIG. 7A is an embodiment of a variable transport delay block for use in settings wherein the aforementioned parameter "L" is variable, as opposed to a constant value which was assumed for the prior analysis.

In a setting of a non constant "L" parameter, the variable transport delay block includes three input which are used to generate a single output. In the present embodiment, as illustrated in FIG. 7A, an input signal "y" 72, a velocity variable "v" 74 and a length variable "L" 76 are each provided to the variable transport delay block 70.

If the length of the transportation (i.e the length of the pipe in the prior example) is also a time varying variable, noted as L(t), then the equation governing the transportation can be expressed as:

$$L(t) = \int_{-t_d}^{t} v(\tau)\,d\tau \qquad \text{Equation 6}$$

wherein the speed of the transportation is denoted as v(t) and the delay time $t_d$ is the delay time parameter needed.

In such a situation where "L" is variable, it is no longer possible to normalize the above equation in accordance with the methods used in the prior illustrative embodiment. Normalization of the above equation is exhibited in Equation 2 of the alternate embodiment wherein:

$$1 = \int_{-td}^{t} \frac{v_i(\tau)}{L}\,d\tau = \int_{-td}^{t} \frac{\frac{1}{L}}{\frac{v_i(t)}{}}\,d\tau$$

Absent the normalization process employed in a setting wherein the "L" parameter is constant, Equation 6 of the present embodiment may be solved using a similar method wherein buffer data is stored for use in interpolation of a final result. The storage of buffer data in accordance with the present embodiment requires the storage of two data sets of buffer data, namely velocity v(t) and Length L(t) data.

Rewriting equation 6 yields:

$$L(t) - \int_{-t_d}^{t} v(\tau)\,d\tau = 0$$

wherein the solution to:

$$L(t) - \int_{k}^{t} v(\tau)\,d\tau < 0$$

and $$L(t) - \int_{k+1}^{t} v(\tau)\,d\tau > 0$$

can be found. In view of this, $$t_k < t - t_d < t_{k+1}$$

Figure 7B:
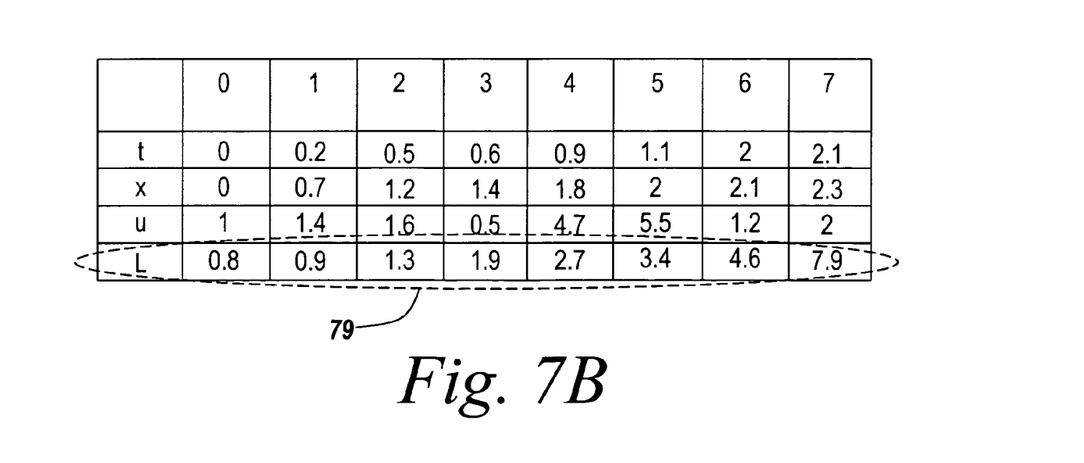
FIG. 7B is an exemplary lookup table dataset for use with an embodiment of the present invention.

Using an interpolation approach, in accordance with the setting wherein "L" is constant, the value of $t-t_d$ can be determined. This interpolation will require the storage of an additional variable, namely L(t) for use in the interpolation of $t-t_d$. An illustrative lookup table including the variable L and the value of L at variable times 79 is illustrated in FIG. 7B. Upon calculating this value, the output "u" 78 of the variable transport delay block can be calculated in accordance with the equation:

$$u = y(t - t_d).$$

This output 78 may be delivered to a graphical block diagram model environment for use in subsequent calculation as understood by one skilled in the art. One skilled in the art will recognize that the present embodiment is a exemplarily embodiment of a block for use in generating a variable transport delay.

One skilled in the art will recognize that the illustrative embodiment may take numerous alternative forms, for example a situation where L is a parameter associated with the variable transport delay block as opposed to the explicit input illustrated. By defining L as a parameter in the present embodiment numerous pieces of information may be further associated with the parameter. For example, not only the value of a parameter may be specified, but also other information about the parameter, such as the parameter's purpose, its dimensions, its minimum and maximum values, etc.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A method for generating a variable transport delay for use with a dynamic system, comprising the steps of:
defining an initial buffer, wherein said buffer stores input data starting at an initial time and ending at a final time;
calculating an instantaneous time delay using said buffer data;
generating a variable transport delay by integrating the instantaneous time delay data by interpolating said buffer data, wherein the variable transport delay is representative of delayed data provided to the buffer.

2. A method for generating a variable transport delay for use with a dynamic system, comprising the steps of:
defining an initial buffer, wherein said buffer stores input data starting at an initial time and ending at a final time, wherein data collected by the buffer is velocity data;
calculating an instantaneous time delay using said buffer data;
generating a variable transport delay by integrating the instantaneous time delay data, wherein the variable transport delay is representative of delayed data provided to the buffer.

3. A method for generating a variable transport delay for use with a dynamic system, comprising the steps of:
defining an initial buffer, wherein said buffer stores input data starting at an initial time and ending at a final time, wherein data collected by the buffer is distance data;
calculating an instantaneous time delay using said buffer data;
generating a variable transport delay by integrating the instantaneous time delay data, wherein the variable transport delay is representative of delayed data provided to the buffer.

4. The method of claim 1, wherein the buffer may collect a plurality of data sets, wherein each of said dataset defines a variable parameter associated with the dynamic system.

5. The method of claim 4, wherein said variable parameter associated with the dynamic system is a variable length parameter.

6. The method of claim 1 wherein the instantaneous time delay is a normalized data value.

7. The method of claim 1 wherein the dynamic system includes variable buffer data during the time beginning at the initial time and ending at the final time.

8. The method of claim 1 wherein the dynamic system includes constant buffer data during the time period beginning at an initial time and ending at a final time.

9. The method of claim 1 wherein the time beginning at an initial time and ending at a final time is divided into uniform time steps.

10. The method of claim 1 wherein the time period beginning at an initial time and ending at a final time is divided into variable time steps.

11. The method of claim 1 wherein the variable transport delay is the value of the integral from an initial time to a final time of the instantaneous time delay.

12. A method for generating a variable transport delay for use with a dynamic system, comprising the steps of:
defining an initial buffer, wherein said buffer stores input data starting at an initial time and ending at a final time;
calculating an instantaneous time delay using said buffer data;
generating a variable transport delay by integrating the instantaneous time delay data, wherein the variable transport delay is representative of delayed data provided to the buffer and wherein the generating a variable transport delay by integrating the instantaneous time delay data is accomplished using a look-up table.

13. A method for generating a variable transport delay for use with a dynamic system, comprising the steps of:
defining an initial buffer, wherein said buffer stores input data starting at an initial time and ending at a final time, wherein the initial buffer is dynamically resizable;
calculating an instantaneous time delay using said buffer data;
generating a variable transport delay by integrating the instantaneous time delay data, wherein the variable transport delay is representative of delayed data provided to the buffer.

14. In a graphical block diagram environment having a variable transport delay block, a method for providing a variable transport delay output to a user, comprising the steps of:
providing a first signal to said variable transport block, wherein said first signal is a signal to be delayed;
providing a second signal to said variable transport block, wherein said second signal is a instantaneous time delay signal;
providing a third signal to the variable transport delay block, wherein said third signal is a time dependent signal used in calculating the instantaneous delay;
generating a variable transport delay output using said first and second signal by integrating the first signal with respect to the instantaneous time delay.

15. The method of claim 14, wherein the first signal is a constant signal.

16. The method of claim 14, wherein the first signal is a variable signal.

17. The method of claim 14, wherein the instantaneous time delay signal is a normalized data value.

18. The method of claim 14, wherein integrating the first signal with respect to the instantaneous time delay occurs at uniform intervals.

19. The method of claim 14, wherein integrating the first signal with respect to the instantaneous time delay occurs at variable intervals.

20. A system for generating a variable transport delay for use with a dynamic system, the system comprising:

a buffer element, wherein said buffer collects data starting at an initial time and ending at a final time;

a calculating element for calculating an instantaneous time delay using said initial time, said final time and buffer data;

an integration element, wherein said integration element generates a variable transport delay based upon data provided to the buffer by interpolating said buffer data.

21. The system of claim 20, wherein said buffer collects a plurality of data sets, wherein each dataset corresponds to a variable necessary in generating a variable transport delay.

22. The system of claim 20, wherein data collected by the buffer is velocity data.

23. The system of claim 20 wherein data collected by the buffer is distance data.

24. The system of claim 20 wherein the dynamic system includes variable buffer data during the time beginning at the initial time and ending at the final time.

25. The system of claim 20 wherein the time beginning at an initial time and ending at a final time is divided into uniform time steps.

26. The system of claim 20 wherein the time period beginning at an initial time and ending at a final time is divided into variable time steps.

27. The system of claim 20, wherein the integration element generates a variable transport delay based upon data provided to the buffer using interpolation of lookup data information.

28. A medium for holding instructions executed in a computer to generate a variable transport delay in a dynamic system, comprising:

defining an initial buffer, wherein said buffer stores input data starting at an initial time and ending at a final time;

calculating an instantaneous time delay using said initial time, said final time and buffer data;

generating a variable transport delay by integrating the instantaneous time delay data, wherein the variable transport delay is representative of delayed data provided to the buffer, by interpolating said buffer data.

29. The medium of claim 28, wherein said buffer collects a plurality of data sets, wherein each data set corresponds to a variable necessary in generating a variable transport delay.

30. The medium of claim 28, wherein data stored by the buffer is velocity data.

31. The medium of claim 28, wherein data stored by the buffer is distance data.

32. The medium of claim 28, wherein the instantaneous time delay is a normalized data value.

33. The medium of claim 28, wherein the time beginning at an initial time and ending at a final time is divided into uniform time steps.

34. The medium of claim 28, wherein the time period beginning at an initial time and ending at a final time is divided into variable time steps.

35. The medium of claim 28, wherein the variable transport delay is the value of the integral from an initial time to a final time of the instantaneous time delay.

36. A medium for holding instructions executed in a computer to generate a variable transport delay in a dynamic system, comprising:

defining an initial buffer, wherein said buffer stores input data starting at an initial time and ending at a final time, wherein the initial buffer is dynamically resizable;

calculating an instantaneous time delay using said initial time, said final time and buffer data;

generating a variable transport delay by integrating the instantaneous time delay data, wherein the variable transport delay is representative of delayed data provided to the buffer.

37. A medium for holding instructions executed in a computer to generate a variable transport delay in a dynamic system, comprising:

defining an initial buffer, wherein said buffer stores input data starting at an initial time and ending at a final time;

calculating an instantaneous time delay using said initial time, said final time and buffer data;

generating a variable transport delay by integrating the instantaneous time delay data, wherein the variable transport delay is representative of delayed data provided to the buffer, wherein generating a variable transport delay by integrating the instantaneous time delay data is accomplished by interpolation of lookup data information.

* * * * *